United States Patent

Debrie et al.

[11] 4,035,707
[45] July 12, 1977

[54] REVERSIBLE MECHANICAL REMOTE-CONTROL DEVICE

[75] Inventors: Guy Debrie, Massy; Michel Petit, La Celle St-Cloud; Jean Vertut, Issy-les-Moulineaux, all of France

[73] Assignee: Commissariat a l'Energie Atomique, Paris, France

[21] Appl. No.: 586,230

[22] Filed: June 12, 1975

[30] Foreign Application Priority Data

June 19, 1974 France .............. 74.21356

[51] Int. Cl.² .............................. G05B 11/01
[52] U.S. Cl. .................... 318/628; 318/562; 318/603; 318/676
[58] Field of Search .......... 318/628, 675, 676, 677, 318/678, 603, 562

[56] References Cited

U.S. PATENT DOCUMENTS

| | | | |
|---|---|---|---|
| 2,410,599 | 11/1946 | Conklin | 318/628 |
| 2,475,484 | 7/1949 | DeNise | 318/628 |
| 2,689,318 | 9/1954 | Goertz et al. | 318/628 |
| 2,760,739 | 8/1956 | Reichert | 318/628 |
| 3,386,021 | 5/1968 | Fisher | 318/628 |
| 3,644,816 | 2/1972 | Gilbert | 318/675 |
| 3,757,187 | 9/1973 | Aria | 318/562 |
| 3,760,251 | 9/1973 | Posi et al. | 318/601 |
| 3,781,627 | 12/1973 | Binnig et al. | 318/562 |

Primary Examiner—Robert K. Schaefer
Assistant Examiner—John J. Feldhaus
Attorney, Agent, or Firm—McNenny, Pearne, Gordon, Gail, Dickinson & Schiller

[57] ABSTRACT

A reversible mechanical assembly is remote-controlled in displacements and in efforts by means of a device comprising a motion detector which delivers a pulse each time a driving shaft associated with a motor rotates by one step, the sign of the pulses being dependent on the direction of rotation of the motor. One input of a summing device is driven by the pulses delivered by the detector and the other input is driven by pulses delivered by an assembly for controlling the motor. The output signal of the summing device is fed back into the control assembly so as to constitute an effort return and also fed to the input of an amplifying circuit for controlling the torque produced by the motor.

7 Claims, 5 Drawing Figures

REVERSIBLE MECHANICAL REMOTE-CONTROL DEVICE

This invention relates to an electromechanical device which serves to carry out the remote control of a mechanical function and is directly applicable to positive and reversible transmission mechanisms, that is to say mechanisms which permit the emission, transmission and remote-controlled restitution of data relating to the positions and couples necessary for direct control of the displacements of a slave modular element by a master modular element and conversely. In other words, the device under consideration ensures not only a transmission of information from the master element to the slave element but also a return of information from the slave element to the master element, which can be modified if necessary by the conditions of movements of said slave element in its own medium, thereby providing a sensitivity feedback to the master element.

In more general terms, the invention relates to a similar device in which the modular master element simulates the mechanical elements; this data-processing unit receives on the one hand the instructions relating to position and effort of an operator, of a program of automatic system operations and so forth, transmits the necessary information to the slave element and also receives from this latter the sensitivity feedback data which are processed together with the position and effort instructions.

Known devices of this type make use of selsyns, potentiometers or resolvers or finally digital position encoders which are disposed in similar manner on the master and slave elements. A relative position difference signal obtained from these two position detectors controls a symmetrical loop circuit which in turn controls motors located respectively on the master element and on the slave element. Said motors thus ensure the transmission of position orders and the restitution of efforts transmitted with a slight relative positional displacement to which corresponds the couple applied as feedback. Similar devices are also known which additionally make use of effort detectors of either the strain-gauge type or of the type involving compression of elastic members. These detectors produce an analog or digital signal which provides information on the applied effort, said position and effort detectors being suitably associated in control loop circuits with a view to achieving the same result. There is finally known a device which makes use of stepping motors associated with a hybrid detector of the position and effort type for delivering pulses corresponding to the same displacement as that performed by the steps of the motors aforesaid, the system just mentioned being also intended to perform the same function.

These different systems are attended by various disadvantages: potentiometers give rise to problems caused by electrical disturbances in the case of long-distance transmissions. The selsyns circumvent this disadvantage by means of the alternating-current signals which they transmit but call on the other hand for a greater number of wires. The resolvers deliver a binary or analog signal but provide absolute coding (as is the case with the optical encoders which are also employed) and entail the need for transmission of high-precision information, therefore of a binary signal comprising a very large number of bits. The same applies to the binary number obtained by conversion of the absolute position signals given by the potentiometers and multiplexing in this absolute digital control of a large number of simultaneous mechanical functions calls for a very large transmission capacity.

Moreover, the use of stepping motors in the last device mentioned permits a considerable reduction of the information load but these motors are associated with irreversible transmissions and their limits of speed or of acceleration limit the performances of the systems with which they are associated.

It is also a known practice to make use of mechanical assemblies which are position-controlled or programmed by means of master units equipped with storage devices, processing logic circuits and functions for controlling slave-control loop circuits which are similar to those mentioned earlier. Such assemblies, however, are usually irreversible and any error in position of the slave mechanism is liable to produce uncontrolled efforts in a rigid environment and in any case may not permit the efforts derived from this medium to produce any automatic reaction on the slave unit.

The device in accordance with the invention is intended to remove these different disadvantages by permitting the use of electric or hydraulic motors of conventional type having high values of torque and low inertia which are associated with reversible mechanical chains while carrying out long-distance digital transmission which requires the minimum amount of information and can therefore be readily multiplexed when a large number of functions are to be controlled at the same time as is the case in master-slave remote manipulators with effort return and improved programmed automats to which this method of control applies.

The device for the remote control of a mechanical assembly in displacements and in efforts, said mechanical assembly being actuated by a motor, is distinguished by the fact that said mechanical assembly is reversible and that it comprises a motion detector which is capable of delivering a pulse each time a shaft which produces the displacements of said mechanical assembly and is associated with said motor rotates by one step, the sign of said pulse being dependent on the direction of rotation of said motor and the pulses being intended to drive a summing device, the other input of said summing device being driven by pulses delivered by an assembly for controlling said motor and constituting orders for the positions of said motor, the output signal of said summing device being on the one hand fed back into said control assembly thereby constituting an effort return and on the other hand fed to the input of an amplifying circuit which controls the torque of said motor.

In a first embodiment (corresponding to the master-slave manipulator), the reversible mechanical device for remote control between a master assembly and a slave assembly, each assembly being actuated by a motor, is distinguished by the fact that each assembly comprises a motion detector which is capable of delivering a pulse each time the shaft which is associated with said motor rotates by one step, the sign of said pulse being dependent on the direction of rotation and the signs of the pulses being opposite when said motors rotate in the same direction. In addition, said device essentially comprises a summing device whose inputs are driven by said pulses, the output of said summing device being connected to two amplifying circuits, each circuit being intended to control one of said motors.

In a preferred embodiment which permits ready remote transfer and transmission by means of a single information line, each detector drives the input of a counter which is mounted in parallel with a storage device, the output of the storage device associated with the slave assembly being connected to a multiplexer which is in turn connected to a demultiplexer, the output of said demultiplexer being intended to drive one of the inputs of said summing device, the other input of which is connected to the output of the storage device which is associated with the master assembly, the output of said summing device being intended to drive a second summing device, the output of said second summing device being connected to the two amplifying circuits. In this preferred embodiment, the remote control device is distinguished by the fact that it comprises a first clock circuit for sequentially initiating the transfer of the contents of the storage device of the slave assembly into the multiplexer and resetting the associated counter to zero, and a second clock circuit for sequentially initiating the transfer of the contents of the storage device which is associated with the master assembly and resetting the associated counter to zero.

In a more elaborate embodiment, two storage devices and a summing device are added in the case of each assembly so as to produce a signal which is representative of the acceleration of each assembly.

In an alternative embodiment, the output of each detector is connected to a counter, the output of which drives a storage device, the output of each storage device being in turn connected to a digital-analog converter, the outputs of said converters being intended to drive the inputs of a summing integrator for delivering at its output an analog signal which is representative of the error between the positions of the slave assembly and the master assembly.

In another mode of execution, the device is distinguished by the fact that the control assembly is constituted by a unit which is provided for processing and/or programming position and effort information and which delivers pulses.

A more complete understanding of the invention will in any case be obtained from the following description of a number of embodiments of the invention which are given by way of example and not in any limiting sense, reference being made to the accompanying drawings, in which.

Figure 1:
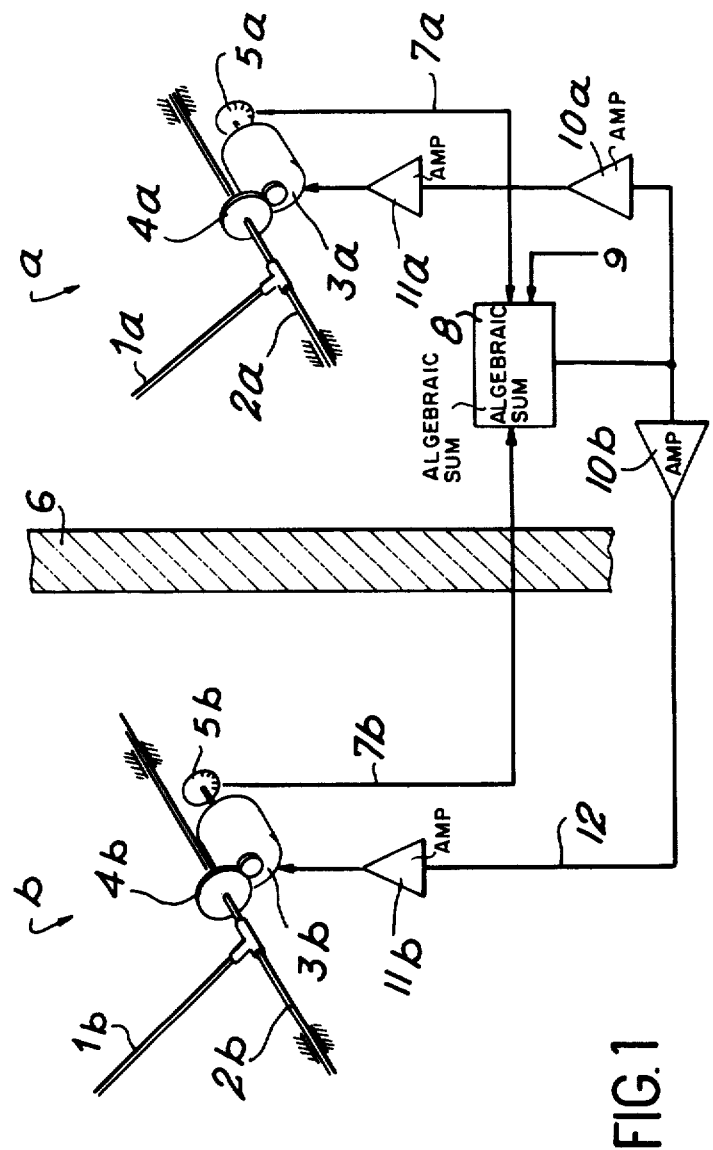
FIG. 1 illustrates a control system in accordance with the invention.

As shown in FIG. 1, the general diagram of a device in accordance with the invention comprising a master assembly $a$ and a slave assembly $b$ fitted respectively with a lever $1a$ which rotates about a pivotal shaft $2a$ on the master assembly and the members having the same reference numerals bearing the index $b$ including the lever $1b$ of the slave assembly which rotates about the pivotal shaft $2b$. Motors $3a$, $3b$ actuate these mechanical transmission devices from gear trains $4a$ and $4b$. The assembly is completed by motion detectors which deliver pulses at the time of rotation of the levers about their pivotal shafts, namely a motion detector $5a$ at the master end and $5b$ at the slave end. It is readily apparent that a distance which may be of substantial value and/or a mechanical obstacle which is difficult to pass through separates the assembly $a$ from the assembly $b$. This barrier and/or distance is represented schematically by the wall 6. It is recalled that the primary aim of the invention is to limit the number and complexity of connections between the assemblies $a$ and $b$. Moveover, it is also an object of the invention to place the maximum number of components close to the assembly which is to be considered as more readily accessible than the assembly $b$ by reason of the distance from the barrier which separates the master assembly from the slave asssembly $b$ or from the deleterious medium in which the assembly $b$ is placed.

It is apparent in the system according to the invention that the pulses delivered by the motion detector $5b$ on the slave side are returned through a single connection $7b$ to the master side and then introduced into a summing device 8 to which the pulses derived from the master motion detector $5a$ are applied through a similar connection $7a$ which does not pass through the barrier. This summing device 8 gives the algebraic result of the cumulated displacements produced by $5a$ and $5b$ or in other words gives at any moment the relative difference in position which may exist between these two controlled elements. The summing device 8 is a digital circuit of a type well known in the art comprising at least two inputs and one output. A digital signal is applied to each input. On its output the summing circuit 8 delivers the algebraic sum of the two input signals. Such a summing device can be synchronous or asynchronous. This error signal is fed simultaneously into two preamplifier assemblies $10a$ and $10b$ and these latter control respectively the power amplifiers $11a$ and $11b$ which in turn control the motors $3a$ and $3b$. It will be noted that, in accordance with a characteristic feature of the invention, the two amplifiers $10a$ and $10b$ are placed in the vicinity of the master arm and that a second connection 12 which is similar to the connection 7 and passes through the barrier 6 delivers the control signals to the power amplifier $11b$ which is located in the vicinity of the motor $3b$ in the deleterious medium and close to an independent power supply which is not shown in the drawings.

The operation of this system will now be explained, starting from an initial position of the levers $1a$, $1b$ which corresponds to a zero algebraic total within the summing device 8. When a movement of displacement is applied to the master lever $1a$, the polarized pulses produced by the motion detector $5a$ (pulses corresponding to unitary increments of displacement and having a sign which indicates the direction of displacement) reach the summing device 8 and cause a position error signal to be generated. By means of the preamplifier $10b$, said signal initiates the displacement of the motor and of the lever $1b$ in the same direction until the pulses arising from the displacement of the detector $5b$ have restored the result produced at the output of the summing device to a zero value. This first case corresponds to a movement of displacement which has not encountered any resistance.

If the lever $1b$ encounters a resistance and the lever $1a$ is displaced, a certain number of pulses will be required in order that the amplifying chain 10b, 11b should supply a sufficiently high value of torque to the motor 3b to overcome the resistance applied to the lever 1b. An equal or proportional value of torque is imparted by the two assemblies 10a, 11a to the similar motor 3a and therefore applies to the lever 1a a resistance which is either equal or proportional to that encountered by the lever 1b. It can be readily be understood that, if the lever 1b is subjected to an active force instead of being subjected to a passive resistance, the system operates in the same manner since it is symmetrical. It is also apparent that a resistance applied to the master arm 1a is liable to cancel the active effort applied to the slave arm 1b, hence the name given to this arrangement: two-way control with effort return or reversible control with effort return.

The motion detector such as 5a or 5b delivers pulses corresponding to a unitary displacement or increment and gives the direction of this displacement at the same time. It is assumed in the example shown that the detector produces positive pulses in one direction and negative pulses in the other direction, said pulses being transmitted through the connection 7a or 7b which joins said detector to the summing device 8.

It is self-evident that, in a machine which employs a remote transmission system of this type, the forces of inertia of the components which may be either the motors 3b and 3a, the levers 1b, 1a or the elements associated therewith also result in dynamic inertia information. It is in fact seen that, if a rapid displacement is applied to the lever 1a, the transient production of an error position signal delivered by the summing device 8 gives rise at the same time to a torque of the motor 3b which imparts the desired acceleration to the lever 1b and at the same time produces a proportional or equal resisting torque by means of the motor 3a at the level of the lever 1a. Thus the effort return is not only static but dynamic, the inertia of the slave assembly being restituted at the master end and being clearly added in that case to the inherent inertia of the master assembly concerned. It is now readily apparent that the main advantages of the arrangement in accordance with the invention are, on the one hand, the small quantity of information transmitted via the line 7 which transmits only the pulses produced as a result of the displacement instead of the potentially rapid repetition of a number representing the absolute position and, on the other hand, the ready possibility of an admission 9 of auxiliary pulses into the summing device 8; said pulses accordingly produce a controlled relative displacement or shift of the lever 1b with respect to the lever 1a, thus permitting auxiliary displacements which are not directly controlled by the lever 1a but which continue at each moment and without interruption to be restituted from the point of view of effort at the level of the master lever 1a.

It can also be noted that, in a preferred arrangement of the invention, the motion detector of the type designated by the references 5a, 5b is placed on the shaft of the motor 3, thereby freeing the control loop from mechanical interaction. The detector can be optical, magnetic and so forth.

Figure 2:
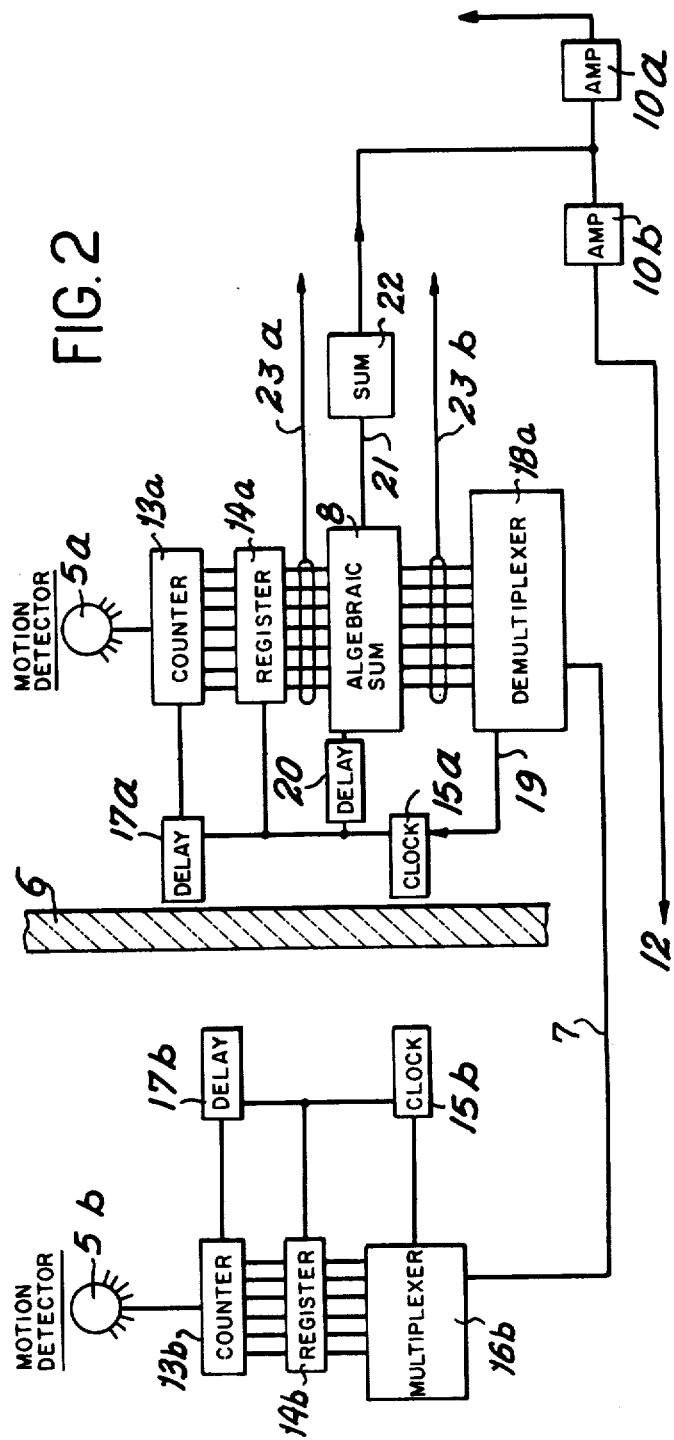
FIG. 2 illustrates an alternative embodiment of the invention in which a sequential summing device is shown in addition.

FIG. 2 illustrates an alternative embodiment of the invention in which recourse is had to sequential counting. If a certain number of functions are to be transmitted simultaneously on a single connection, each of these functions must be sampled in order to carry out a so-called multiplex control. To this end and in accordance with a well-known technique, there is sampled in each sequential counter the balance of displacement during a given time interval which must be within the range of 1/10 and 1/100 of a second in order that these values should be addressed in series in a single signal in respect of each movement considered. After demultiplexing, said single signal will restitute each of these samples in the corresponding channels.

The motion detector 5b which transmits polarized pulses to a counter 13b is shown in FIG. 2 at the slave end, said counter being followed by a register 14b which is mounted in parallel. A clock 15b initiates transfer from the register 14b which constitutes the storage device into the multiplexing unit 16b. After a slight time-lag caused by the element 17b, the clock resets the counter 13b to zero. After all the information derived from units similar to the detector 5b which are capable of simultaneous displacement have been transferred via the channel 7, demultiplexing by the receiving unit 18a at the master end restitutes the same sequential count of the displacements of the detector 5b. A clock 15a at the master end having the same frequency controls a similar line 13a, 17a, 14a which delivers directly to the summing device 8 the sequential counts of the displacements of the detector 5a.

It is therefore apparent that the summing device shown in the example of FIG. 2 operates sequentially and receives the same information as in the general diagram shown in FIG. 1. On the other hand, the arrangement of the counters and registers 13 and 14 both at the master end and at the slave end which are associated with the clocks 15 carry out the sequential form of summation of the displacements as claimed in this alternative embodiment of the invention. The summing device 8 is capable of receiving the sequential counts obtained from the master and slave ends in either a synchronous manner and continuously establishes the balance of variations of the relative position of the slave assembly with respect to the master assembly. If the summing device is synchronous, it is necessary in that case to ensure synchronism of the clocks 15a and 15b; the clock 15b which is reconstituted at the output of the demultiplexer 18a is designated by the arrow 19. Zero-setting of the summing device 8 initiated by the clock 15a by means of the delay circuit 20 accordingly makes it possible at the output 21 of the summing device 8 to give a digital representation of the instantaneous differential velocity which is synchronized with the clock pulse delivered at 19 by the demultiplexer 18. In this case, a second summing device 22 performs the integration of said differential velocity and therefore gives sequentially the value of the relative-position error.

Moreover, the output 23b of the demultiplexer gives the numerical value of the slave velocity in synchronism with the clock. Similarly, the output of the storage register 14a gives the master velocity at 23a. It is thus apparent that, by virtue of the outputs 21, 22, 23a and 23b, there are made available the difference in velocity, the difference in position at instantaneous value as well as the master and slave velocities, all these elements being clearly necessary for the control-loop circuits which control the master and slave motors by means of the power amplifiers 11a and 11b of FIG. 1.

Figure 3:
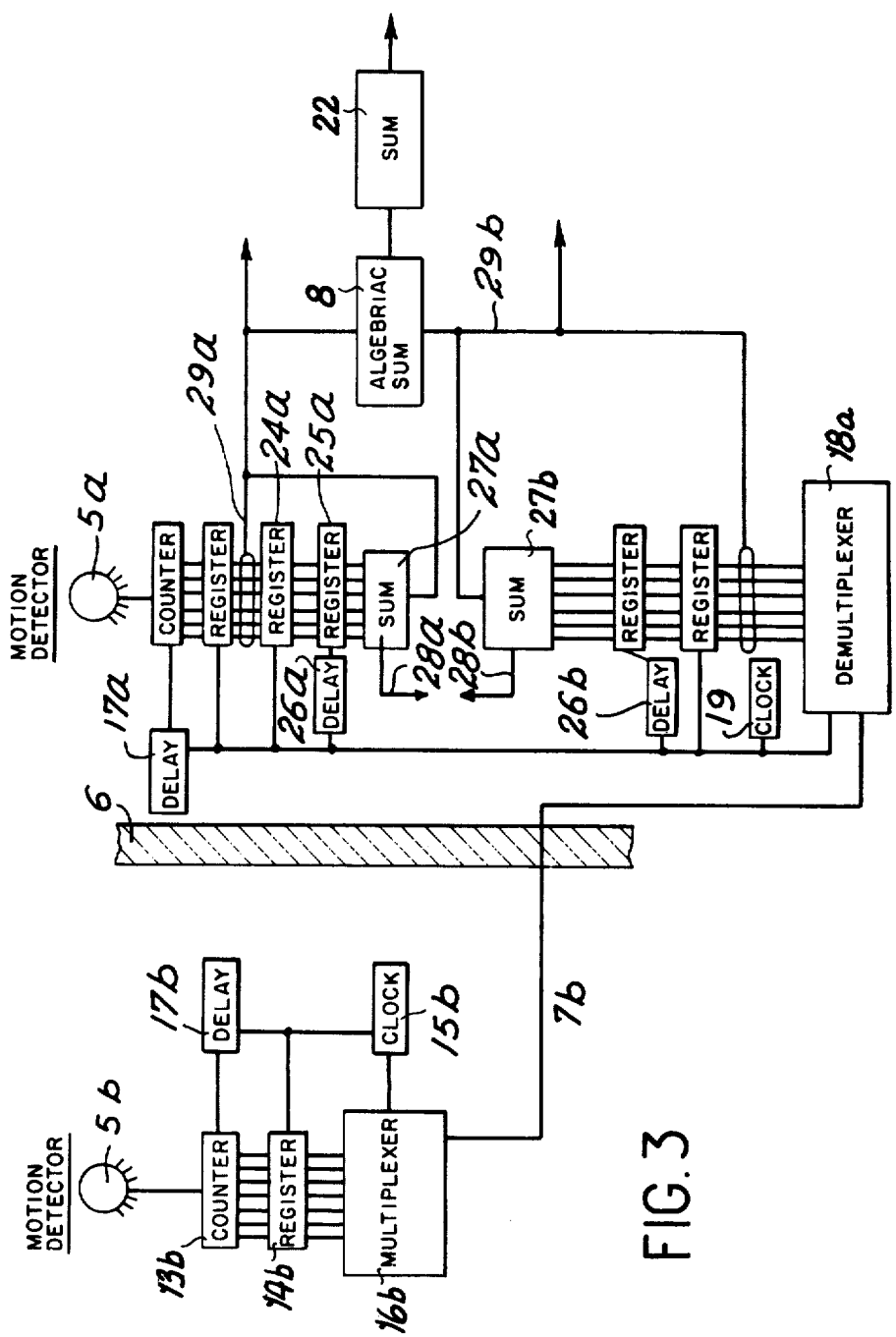
FIG. 3 shows an alternative embodiment of the invention in which provision is additionally made for sequential storage devices and for a second summing device.

FIG. 3 shows the manner in which sequential information relating to the acceleration of the master arm and of the slave arm can be added to these different data by making use of the complementary storage devices. These data are of great value for improving the effort return system which can thus be corrected for certain effects arising from the inherent inertia of the manipulator components as explained earlier.

The elements which were already illustrated in FIG. 2 are again shown in FIG. 3, in which the characteristic feature of the invention as described is concerned with the use of two additional storage devices in each circuit. There is again shown the same dissymmetry of location between the deleterious medium in which the elements $b$ or so-called slave elements are placed, said elements being separated from the location in which the master elements $a$ are placed by means of the partition-wall 6. The slave elements are strictly the same, the pulses produced by the motion detector 5$b$ being accordingly fed into the sequential counter 13$b$ which transmits its sequential count into the storage device or register 14$b$, both these units being controlled by the clock 15$b$. The counter 13$b$ is reset to zero by the clock 15$b$ through the delay circuit 17$b$. The same clock initiates the transfer of information contained in the register 14$b$ into the multiplexer assembly 16$b$ which is shown partially and the connection 7 transmits the entire quantity of multiplexed digital information into the demultiplexer 18$a$ at the master end. Said demultiplexer delivers the clock signals which are reconstituted at 19 and control the elements at the output of the demultiplexer.

In accordance with this alternative embodiment of the invention, a first storage device or register 24$b$ stores the information delivered by the demultiplexer 18$a$, a second register 25$b$ receives the information from the first register 24$b$ when the clock 19 transmits a signal thereto after a short time-lag which is controlled by the delay element 26$b$. The same signal causes the contents of the register 25$b$ to be transferred into a summing device 27$b$ in which it is subtracted from the instantaneous information obtained directly from the device 14$b$ via the line 26$b$. There is accordingly established the difference in instantaneous velocity at the given instant and at the previous instant of a clock period. The output 28$b$ of said sequential summing device therefore gives the value of acceleration of the slave element whose information is obtained from the motion detector 5$b$. Moreover, the information which gives the instantaneous slave velocity is obtained directly from the demultiplexer via the connection 29$b$, the extension of which enters the summing device 8. Similarly, there is shown at the master end the motion detector 5$a$ whose data are counted in the counter 13$a$ in accordance with the sequences obtained from the clock 19 which are slightly retarded by the delay element 17$a$. These data are stored in a register 14$a$, the function performed by the register in this case being similar to that of the demultiplexer.

Two further storage devices or registers 24$a$ and 25$a$ are provided in accordance with the alternative embodiment of the invention shown in FIG. 3 and are similar to those designated by the references 24$b$ and 25$b$. Under the action of the clock pulses, said devices deliver the instantaneous velocity during the previous time interval into the summing device 27$a$ in which they are subtracted from the instantaneous information delivered by the device 14$a$ and derived from the transmission line 29$a$. Similarly, the instantaneous value of acceleration of the master assembly is given at the output 28$a$ of said summing device 27$a$ while the instantaneous velocity information of 29$a$ also passes into the summing device 8 which is followed by a second summing device 22 as was explained in the description given earlier with reference to FIG. 2.

It is thus possible to see how further information on the master and slave accelerations which are useful for controlling the motors of the master and slave units can be obtained on each arm and in accordance with the characteristic feature of the invention, by making use of a second sequential counter preceded by an auxiliary storage device. It is apparent that the diagrams given in FIGS. 2 and 3 give a fully digital version of the invention which is particularly well suited to a practical construction involving the use of a mini-computer or a digital micro-computer.

Figure 4:
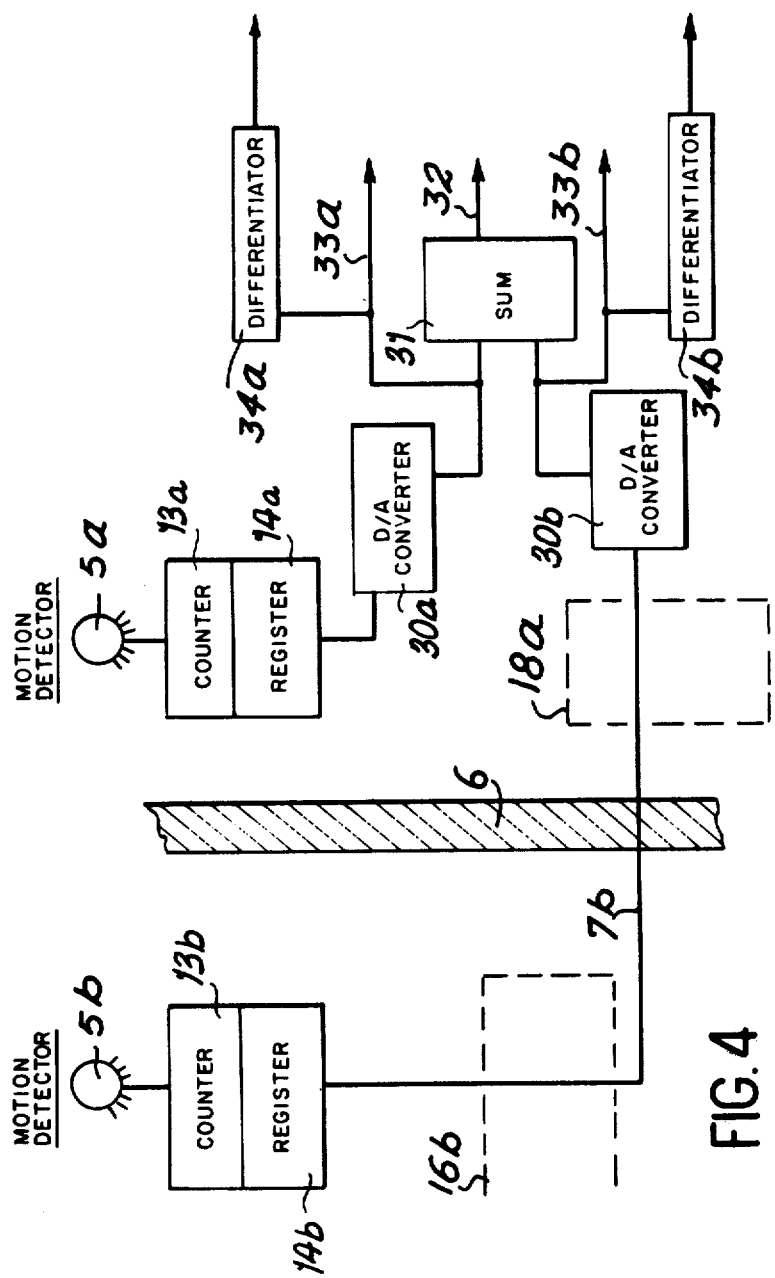
FIG. 4 illustrates an alternative form in which recourse is had to digital-analog conversion.

The practical application of FIG. 4 shows another form of construction in which digital-analog conversion is performed.

There are shown in FIG. 4 the same elements as in FIGS. 1 and 2, namely the master and slave motion detector 5$a$ and 5$b$, the sequential counting assembly 13$b$, 14$b$ and 13$a$, 14$a$ which is represented as a single processing unit, the connection 7 from the slave unit to the master unit which may or may not pass through a multiplexing device 16$b$ and a corresponding demultiplexing device 18$a$ in order to feed the instantaneous digital velocity information into a digital-analog converter 30$b$ to which corresponds a similar master element 30$a$. The respective outputs of these latter produce an analog voltage which represents at each instant the speed of the corresponding master or slave element.

In order to simplify the description, it is recalled that the elements 5$a$ and 5$b$ deliver pulses of opposite sign when they rotate in the same direction. Under these conditions, the algebraic sum of the instantaneous velocities is formed by addition in a summing device 31 which integrates the instantaneous velocity error signal and gives at 32 the analog value of the position error signal by means of the incremental signals delivered by the motion detectors 5$a$ and 5$b$ whilst the direct outputs 33$b$ and 33$a$ respectively of the slave velocity and master velocity information can be employed in the control assembly as shown in FIG. 1. Should this prove necessary, the values of the accelerations can also be obtained at the level of these analog data relating to master and slave velocity by means of a differentiating circuit 34$b$ and its corresponding circuit 34$a$.

It is apparent that, by virtue of this embodiment, the system for measuring displacements associated with the sequential counting and with the summing device can be connected directly to an analog control loop circuit, the structure of which is in any case well known. One of the important advantages of the transmission system in accordance with the invention can be understood from the descriptions which have just been given and more especially with reference to FIGS. 2, 3 and 4. In fact, if the system consisting of a master unit and slave unit for motion reproduction and two-way effort transmission calls for minimum sensitivity corresponding for example to a unitary position error signal, it is further apparent that the corresponding relative mechanical displacement between the master unit and the slave unit must remain of very small value, for example 1/10 mm in the case of the threshold which has just been mentioned. Moreover, if the range of a movement which is normally indicated by an absolute position encoder is one or a number of meters, it is apparent that the order of magnitude of the number which indicates this position must be 10,000, namely 13 to 14 bits in binary writing, whether this binary number is derived from the conversion of an analog voltage or from a phase shift in a resolver or finally indirectly from an absolute optical encoder.

Moreover, if the master or slave unit is intended to move at a rate of the order of 1 meter per second, it is clearly necessary to operate at a frequency of 50 to 100 cycles per second at the time of sequential transmission by multiplex. Under these conditions, it is necessary to carry out the transfer of a 13 bit information at a rate of 50 to 100 times per second, which entails the need for complex electronic circuitry.

Consideration will now be given to the circuit arrangement employed in accordance with the invention. Thus, if a pulse corresponds to 1/10 mm, the maximum velocity of 1 m/s corresponds to 10,000 steps per second, namely to 100 steps 100 times per second or 200 steps at 50 cycles per second. The maximum number which must therefore be counted, multiplexed, transmitted, demultiplexed and employed is now only a number consisting of 7 to 8 bits instead of 13. This arrangement dispenses with the absolute position reference and its whole advantage lies in the weight reduction of the transmission system of the multiplex or demultiplex elements as well as the computing elements which can be given a digital construction (in the case illustrated in either FIG. 2 or FIG. 3) within a mini-computer. The extent of simplification thereby achieved is such that a substantial advantage is found in this mode of utilization in which guidance of the slave arm both by sight and "touch" is primarily sought.

Moreover, as has been seen earlier, the device in accordance with the invention facilitates the achievement of auxiliary relative displacements to a very great extent without resulting in any loss at any moment of the effort return at the master end.

Finally, on condition that the mechanical assembly and the control system are well designed, any possible counting loss can be completely avoided and this accordingly makes it possible to provide light information to be recorded on magnetic tapes for programming a remote manipulator in real time.

All the foregoing considerations also apply within the scope of the invention to the case in which the master unit is constructed in the form of a processing and/or programming unit for analyzing feedback data in the place of an operator and combining them with orders which are programmed or also originate from an operator and give the orders deduced therefrom to the slave arm.

Figure 5:
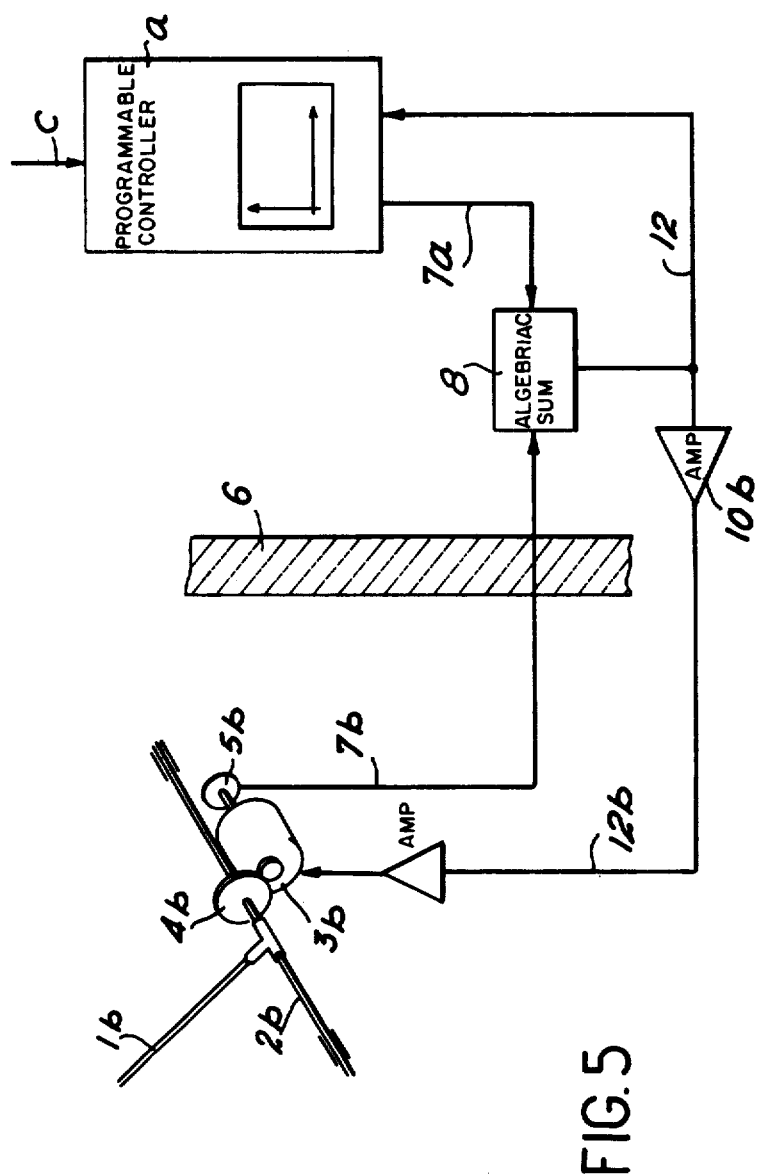
FIG. 5 is a diagram illustrating the second embodiment in which use is made of the processing unit.

FIG. 5 illustrates this form of construction. The slave end (designated by the reference $b$) is identical with the assembly shown in FIG. 1. At the master end, it is seen that the mechanical element (motor, lever, detector) is replaced by a unit $a$ for processing and/or programming position and effort information. This unit receives position and effort instructions as indicated in the figure by the arrow C. These instructions can be recorded in a magnetic memory, for example. The unit $a$ processes these instructions so as to deliver in the form of pulses, for example, instructions which are introduced into the summing device 8 via the line 7a. At the output of the summing device 8, the error signal is fed back to the processing unit $a$ via the line 12. This feedback operation accordingly modifies the processing of the instructions C and thus constitutes the effort return.

What we claim is:

1. A device for the remote control of a first mechanical assembly in displacements and in efforts, the first mechanical assembly being actuated by a first motor having a respective shaft, the device comprising a second mechanical assembly actuated by a second motor having a respective shaft, first and second displacement detectors, each detector being associated with a respective one of the motors, each detector being capable of delivering a series of pulses each time the shaft associated with its corresponding motor rotates by a predetermined number of steps, the shaft rotation producing a displacement of its associated mechanical assembly, the sign of the pulses being dependent on the direction of rotation of the respective motor, the signs of the pulses delivered by each detector being opposite when the motors rotate in the same direction, a first summing device provided with a first and second input and one output, and two amplifying circuits, one amplifying circuit controlling the torque of the first motor, the other amplifying circuit controlling the torque of the second motor, each series of pulses driving an input of a counter which is mounted in parallel with a storage device, an output of the storage device which is associated with the first mechanical assembly being connected to a multiplexer which is in turn connected to a demultiplexer, an output of the demultiplexer driving one of the inputs of the first summing device, the other input of the first summing device being connected to the output of the storage device which is associated with the second mechanical assembly, the output of the first summing device driving a second summing device, the output of the second summing device being connected to the two amplifying circuits, the device including a first clock circuit for sequentially initiating the transfer of the contents of the storage device of the first mechanical assembly into the multiplexer and resetting the associated counter to zero, and a second clock circuit for sequentially initiating the transfer of the contents of the storage device which is associated with the second mechanical assembly and resetting the associated counter to zero.

2. A device according to claim 1, wherein the first summing device is synchronous and wherein the two clock circuits are synchronized by means of the multiplexer and demultiplexer.

3. A device according to claim 1, wherein the output of the demultiplexer is also connected to an input of a third storage device which is connected to a fourth storage device having an output driving one of two inputs of a third summing device in which the other input of the third summing device is connected directly to the output of the demultiplexer, the transfer of the contents of the third storage device into the fourth storage device being initiated by said clock, the transfer of the contents of the fourth storage device into said third summing device being initiated by said clock, and wherein the storage device associated with the second mechanical assembly drives fifth and sixth storage devices mounted in series, the sixth storage device driving one of two inputs of a fourth summing device in which the other input of said fourth summing device is driven directly by the output of the sixth storage device which is associated with the second mechanical assembly, the transfer of the contents of the fifth storage device being initiated by said clock, the transfer of the contents of the storage device into the fourth summing device being initiated by said clock.

4. A device for the remote control of a first mechanical assembly in displacements and in efforts, the first mechanical assembly being actuated by a first motor having a respective shaft, the device comprising a second mechanical assembly actuated by a second motor having a respective shaft, first and second displacement detectors, each detector being associated with a respective one of the motors, each detector being capable of delivering a pulse each time the shaft associated with its corresponding motor rotates by one predetermined step, the shaft rotation producing a displacement of its associated mechanical assembly, the sign of the pulse being dependent on the direction of rotation of the respective motor, the signs of the pulses delivered by each detector being opposite when the motors rotate in the same direction, wherein the output of each detector is connected to a counter having an output driving a storage device, the output of each storage device being in turn connected to a digital-analog converter, the outputs of said converters driving inputs of a summing integrator for delivering an analog signal which is representative of an error between the positions of the first mechanical assembly and of the second mechanical assembly.

5. A device according to claim 4, wherein said device includes a multiplexer and a demultiplexer between the storage device of the first mechanical assembly and the input of the associated digital-analog converter.

6. A device according to claim 5, wherein the output of each digital-analog converter also drives a differentiating circuit which thus delivers at its output a signal representing the acceleration respectively of the second mechanical assembly and of the first mechanical assembly.

7. A device for the remote control of a first mechanical assembly in displacements and in efforts, the first mechanical assembly being actuated by a first motor having a respective shaft, the device comprising a second mechanical assembly actuated by a second motor having a respective shaft, first and second displacement detectors, each detector being associated with a respective one of the motors, each detector being capable of delivering a pulse each time the shaft associated with its corresponding motor rotates by one predetermined step, the shaft rotation producing a displacement of its associated mechanical assembly, the sign of the pulse being dependent on the direction of rotation of the respective motor, the signs of the pulses delivered by each detector being opposite when the motors rotate in the same direction, a summing device provided with a first and a second input and one output, the pulses delivered by the detector associated with the first motor driving the first input and the pulses delivered by the detector associated with the second motor driving the second input, and two amplifying circuits, the output of the summing device being electrically connected to the amplifying circuits, one amplifying circuit controlling the torque of the first motor, the other amplifying circuit controlling the torque of the second motor.

* * * * *